United States Patent [19]

Comerford et al.

[11] 4,156,263
[45] May 22, 1979

[54] HAZARDOUS VOLTAGE PROTECTOR FOR TELEPHONE LINE

[75] Inventors: Timothy N. Comerford; Peter O. Schuh, both of Indianapolis, Ind.

[73] Assignee: Bell Telephone Laboratories, Incorporated, Murray Hill, N.J.

[21] Appl. No.: 865,714

[22] Filed: Dec. 29, 1977

[51] Int. Cl.² .............................................. H02H 3/28
[52] U.S. Cl. ...................................... 361/42; 361/45; 361/60
[58] Field of Search ............... 361/42, 45, 60, 187; 179/175.3 F

[56] References Cited

U.S. PATENT DOCUMENTS 3,213,321  10/1965  Dalziel .......................... 179/175.3

FOREIGN PATENT DOCUMENTS 45865  7/1962  Poland ............................ 361/45

Primary Examiner—Harry E. Moose, Jr.
Attorney, Agent, or Firm—Harry L. Newman

[57] ABSTRACT

In order to prevent excessive voltages originating in customer owned terminal equipment from creating a hazardous condition in an associated telephone line, a protective circuit is connected between the equipment and the line. This circuit responds to an unbalanced current flow by disconnecting the equipment from the line and providing a local path to ground for the current. The circuit remains activated as long as the unbalanced current flow continues and reconnects the equipment to the line only when the current flow ceases.

10 Claims, 3 Drawing Figures

HAZARDOUS VOLTAGE PROTECTOR FOR TELEPHONE LINE

FIELD OF THE INVENTION

This invention relates to the field of protective devices for telephone lines and within that field to a circuit for isolating terminal equipment connected to a telephone line responsive to the application of hazardous voltages to the line.

BACKGROUND OF THE INVENTION

With the announcement by the Federal Communications Commission in 1967 of its intention to grant permission for telephone company customers to install and maintain their own terminal equipment, there arose a concern on the part of telephone companies that this will increase the possibility that voltages hazardous to telephone craftspersons will be accidentally applied by the customer to the telephone line. Hazardous voltages are introduced at the site of terminal equipment from two major sources. The first of these sources is crosses with the phase or hot conductor of a 110-volt commercial power line, and the second is crosses associated with key telephone system ringing generators.

By far the most common situation that can be expected is that such crosses will result in a voltage being applied to one or both tip and ring line conductors with respect to ground. Such a voltage is referred to as a longitudinal voltage, and it produces an unbalanced current flow through the telephone line when a path to ground is provided. It is expected that crosses that result in a voltage being applied only between the tip and the ring line conductors, referred to as a metallic voltage, will be less common. Such a voltage produces a balanced equal and opposite current flow through the tip and ring line conductors when a path between the conductors is provided.

SUMMARY OF THE INVENTION

In accordance with the present invention, protection from hazardous voltages originating in terminal equipment is provided by a circuit that serves as an interface between the equipment and its associated telephone line. The circuit operates on the principle of detecting an unbalanced current on the telephone line in excess of a threshold level. Upon detection, the terminal is disconnected from both the ring and tip conductors to remove the hazardous voltage from the telephone line. In addition, the unbalanced current is routed through a path to local ground that maintains the disconnect condition until the hazardous voltage is removed.

In the basic protective circuit of the present invention, the unbalanced current flow can only result from the application of a longitudinal voltage to the telephone line. However, with the addition of a subcircuit, the protective circuit is modified so that an unbalanced current also results from the application to the line conductors of a metallic voltage above a critical threshold.

A protective circuit in accordance with the present invention includes a pair of relays that operate in sequence. The first relay has a pair of bifilar windings that are respectively connected in series with the ring and tip conductors of the telephone line. Normal operation of the terminal equipment connected to the telephone line involves signals, such as dial tone, ringing, and speech, that are produced by metallic potentials being applied to the telephone line that are below the critical threshold. These metallic potentials result in equal and opposite current flow through the bifilar windings of the first relay. Consequently, the two flux fields generated cancel each other out, and the relay does not operate.

However, when as a result of the application of a hazardous voltage to the telephone line, unbalanced current flows through the bifilar windings, the first relay operates to establish a path through the winding of the second relay to ground. The second relay then operates to first connect the leads of the terminal equipment to ground through the winding of the second relay and then disconnects the terminal equipment from the telephone line. The second relay remains operated as long as the current flow continues. Thus, it is seen that the current to operate the protective circuit is derived from the hazardous voltage source itself, and only if the hazardous voltage is removed does the second relay release to restore the connection of the terminal equipment to the telephone line.

DETAILED DESCRIPTION OF ILLUSTRATIVE EMBODIMENT

Figure 1:
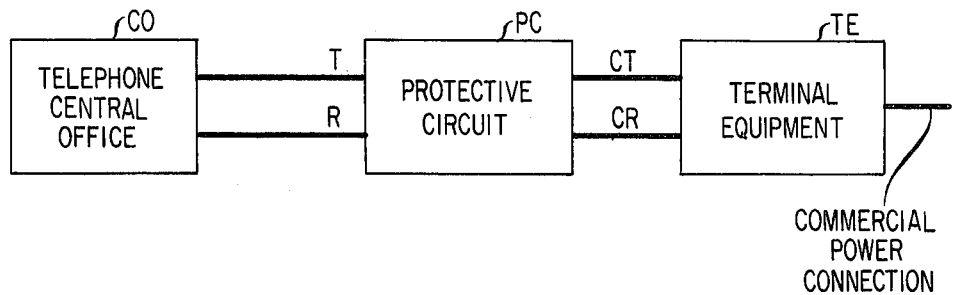
FIG. 1 is a schematic diagram of the protective circuit installed in a typical connecting path between a telephone central office and customer owned terminal equipment.

Referring to FIG. 1, the portion of a telephone system in which the protective circuit of the present invention is used is a subscriber loop which consists of tip and ring conductors T and R that connect terminal equipment TE to a central office CO. When the terminal equipment TE is customer owned and includes a commercial power connection, such as in the case of a key telephone system, the protective circuit PC is advantageously used as an interface between tip and ring leads CT and CR of the terminal equipment and the tip and ring conductors T and R of each telephone line connected to the equipment.

Figure 2:
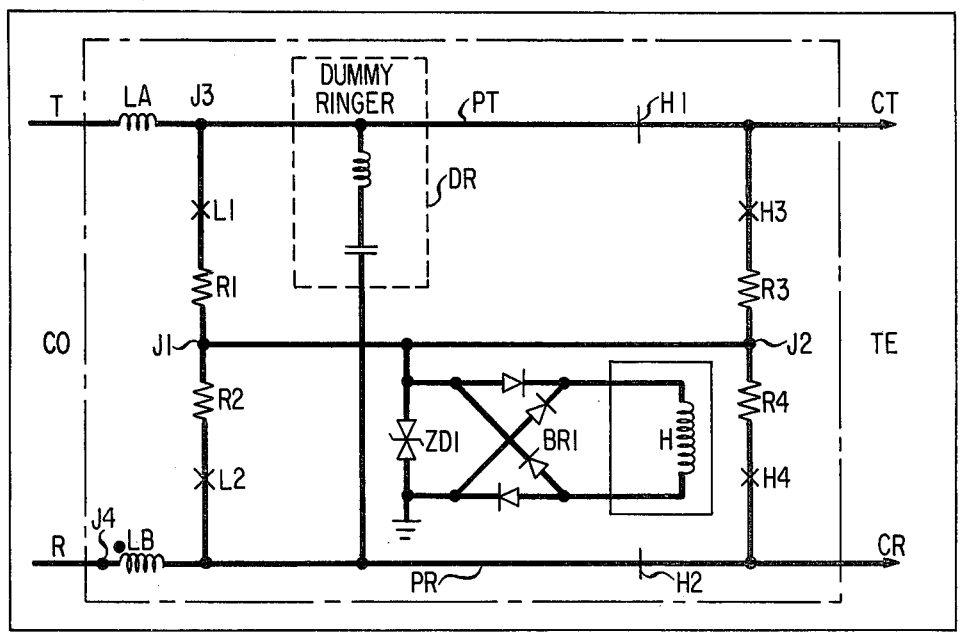
FIG. 2 is a circuit diagram of an illustrative embodiment of the basic protective circuit of this invention which responds only to longitudinal voltages.

Turning now to FIG. 2, the protective circuit PC includes tip and ring paths PT and PR that connect the tip and ring leads CT and CR of the terminal equipment to the tip and ring conductors T and R of the associated telephone line. Respectively connected in series with the tip and ring paths PT and PR are bifilar windings LA and LB of a line relay having make contacts L1 and L2. The make contacts L1 and L2 respectively connect the tip and ring paths PT and PR through resistors R1 and R2 to a common junction J1. The junction J1 is in turn connected through a full wave bridge rectifier BR1 and a winding H of a hold relay to ground, a protective zener diode ZD1 being connected across the bridge rectifier and winding.

The hold relay includes a pair of break contacts H1 and H2 respectively connected in series with the tip and ring paths PT and PR. In addition, the hold relay includes a pair of make contacts H3 and H4 that respectively connect the tip and ring paths PT and PR through resistors R3 and R4 to a common junction J2. The junction J2, like the junction J1, is connected through the bridge rectifier BR and the hold relay winding H to ground.

When a metallic potential is applied to the tip and ring paths PT and PR, such as occurs in the conventional operation of the telephone network, equal and opposite current flow occurs through the bifilar windings LA and LB of the line relay. As a result, the two flux fields generated cancel each other, and the line relay does not operate.

When, however, a longitudinal potential is applied to the tip and ring paths PT and PR and a ground path is provided, the flux generated in the bifilar windings LA and LB by the resulting unbalanced current flow does not cancel out. As stated in the "Background of the Invention" discussion, one cause for such a longitudinal potential is a commercial power cross with either the tip or the ring leads CT or CR in the terminal equipment TE. Then when a ground link is provided, such as when a crafts persons body comes into contact with the associated tip or ring conductor T or R of the telephone line, the resulting current flow causes the line relay to operate.

If, for example, the unbalanced current flow occurs in the tip path PT of the protective circuit PC, the line relay is operated by the flux generated in the winding LA. Make contacts L1 and L2 both close, and a path to ground is provided through the closed contacts L1, the resistor R1, the junction J1, and the bridge rectifier BR and winding H of the hold relay. The hold relay is thereupon energized, and the make contacts H3 and H4 thereof close to provide a second path to the local ground through the closed contacts H3, the resistor R3, the junction J2, and the bridge rectifier BR and winding H. The energization of the hold relay also causes the break contacts H1 and H2 thereof to open to disconnect the tip and ring leads CT and CR of the terminal equipment from the tip and ring conductors T and R of the telephone line.

Thus, the telephone line is isolated from the terminal equipment and a path to local ground is provided for the hazardous potential. In addition, the isolation and path to ground is maintained until the hazardous potential is removed. A dummy ringer DR connected across the tip and ring paths PT and PR on the central office side of the break contacts H1 and H2 provides a termination for the telephone line during this time.

Figure 3:
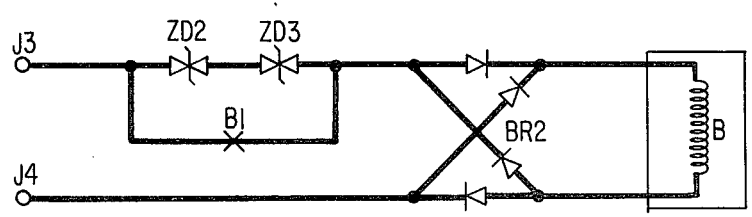
FIG. 3 is a circuit diagram of a subcircuit that when added to the circuit of FIG. 2 modifies the protective circuit to also respond to metallic voltages exceeding a critical threshold.

Turning now to FIG. 3, there is shown a circuit that when connected between junction J3 in the tip path PT and junction J4 in the ring path PR causes the line relay to respond to metallic voltages in excess of a critical threshold. The subcircuit comprises a pair of series zener diodes ZD2 and ZD3 connected in series with a bridge rectifier BR2 and winding B of a bypass relay, the relay having make contacts B1 in parallel with the zener diodes. When a metallic potential exceeding the breakdown voltage of the zener diodes ZD2 and ZD3 is applied across the tip and ring paths PT and PR, a crossover path is completed between the junctions J3 and J4. It is seen that current that flows through the crossover path only flows through the winding LB and not the winding LA of the line relay. This current flow causes the bypass relay to operate and close the make contacts B1 whereby a protective bypass is provided around the zener diodes ZD2 and ZD3. This current flow also causes the line relay to operate, and the same sequence previously described occurs whereby the terminal equipment TE is isolated from the telephone line.

An alternative embodiment of the present invention is disclosed in the copending U.S. patent application of A. M. Gordon, E. F. Mazurek, and A. B. Wright, Ser. No. 764,594, filed Feb. 1, 1977, assigned to the assignee of the present invention and issued on Aug. 8, 1978 as U.S. Pat. No. 4,106,070.

What is claimed is:

1. A protective circuit for providing an interface between terminal equipment and a telephone line including tip and ring conductors that connect the terminal equipment to a central office, the circuit comprising:
   tip and ring paths for connecting tip and ring leads of the terminal equipment to the tip and ring conductors of the telephone line;
   means for detecting a current imbalance in the tip and ring paths; and
   means responsive to detecting the imbalance for interrupting the tip and ring paths and for restoring the continuity of the tip and ring paths only upon removal of the current imbalance.

2. A protective circuit as in claim 1 wherein the detecting means includes means for establishing a path to local ground from both the tip and ring paths.

3. A protective circuit as in claim 1 wherein the detecting means comprises a first relay having a pair of bifilar windings that are respectively connected in series with the ring and tip paths and make contacts for establishing a path to local ground from both the ring and tip paths.

4. A protective circuit as in claim 3 wherein the responsive means comprises a second relay having a winding in series with the make contacts of the first relay, the path to local ground being through the winding of the second relay.

5. A protective circuit as in claim 4 where the second relay has break contacts respectively connected in series with the tip and ring paths.

6. A protective circuit as in claim 5 wherein the second relay also has make contacts for establishing a second path from the tip and ring paths through the winding of the second relay to local ground whereby the second relay remains operated until the current imbalance is removed.

7. A protective circuit as in claim 1 further including means responsive to a metallic voltage above a critical threshold being applied across the tip and ring paths for causing an unbalanced current to flow in the paths.

8. A circuit for isolating a telephone line from a terminal at the end of the line, the circuit comprising:
   tip and ring paths for respectively connecting tip and ring leads of the terminal with tip and ring conductors of the telephone line;
   first means for sensing an unbalanced current in the tip and ring paths; and
   second means responsive to the sensing means for interrupting the tip and ring paths and for completing a path from the tip and ring paths to a local ground.

9. A circuit as in claim 8 wherein the second means restores the continuity of the tip and ring paths only when the unbalanced current is removed.

10. A protective circuit as in claim 8 further including means responsive to a metallic voltage above a critical threshold being applied across the tip and ring paths for causing an unbalanced current to flow in the paths.

* * * * *